(12) United States Patent  (10) Patent No.: US 8,709,186 B2
Gautier et al.  (45) Date of Patent: Apr. 29, 2014

(54) METHOD OF PRODUCING REINFORCED, FORMED FABRICS

(75) Inventors: Gérard Gautier, Yens (CH); Edouard Kessi, St-Prex (CH)

(73) Assignee: Createx S.A., Morges (CH)

( * ) Notice: Subject to any disclaimer, the term of this patent is extended or adjusted under 35 U.S.C. 154(b) by 236 days.

(21) Appl. No.: 12/274,307

(22) Filed: Nov. 19, 2008

(65) Prior Publication Data

US 2009/0140455 A1  Jun. 4, 2009

Related U.S. Application Data

(62) Division of application No. 10/521,160, filed as application No. PCT/CH03/00415 on Jun. 25, 2003, now Pat. No. 7,479,200.

(30) Foreign Application Priority Data

Jul. 2, 2002 (CH) ...................................... 1150/02

(51) Int. Cl.
  *B63H 9/06*  (2006.01)
(52) U.S. Cl.
  USPC .................... 156/182; 156/307.1; 114/102.31
(58) Field of Classification Search
  USPC ...................................................... 156/583.3
  See application file for complete search history.

(56) References Cited

U.S. PATENT DOCUMENTS

| | | |
|---|---|---|
| 2,356,225 A | 8/1944 | Cunnington |
| 2,410,888 A | 11/1946 | Lucy |
| 2,565,219 A | 8/1951 | Gardiner et al. |
| 2,665,132 A | 1/1954 | Robinson |
| 2,965,532 A | 12/1960 | Taylor |
| 2,998,343 A | 8/1961 | Gold et al. |
| 3,903,826 A | 9/1975 | Andersen |
| 3,954,076 A | 5/1976 | Fracker |

(Continued)

FOREIGN PATENT DOCUMENTS

| | | |
|---|---|---|
| DE | 29 26 476 A1 | 1/1981 |
| DE | 31 19 734 A1 | 12/1982 |

(Continued)

OTHER PUBLICATIONS

Definition of sail, Merriam Webster Dictionary, Tenth Edition, 1998.*

(Continued)

*Primary Examiner* — Barbara J Musser
(74) *Attorney, Agent, or Firm* — Foley & Lardner LLP (57) ABSTRACT

The invention relates to a method of producing reinforced, formed fabrics, consisting in producing a continuous fabric alternated with a membrane (34) containing embedded reinforcing elements, which is prepared in overlapping portions on a conveyor belt (29) which passes over a preparation table (25). The membrane (34) and the reinforcing elements are then positioned under a press consisting of an upper air-filled chamber (1), the lower part thereof comprising a flexible element (4), and a lower water-filled chamber (14), the upper part thereof comprising a flexible element (17). According to the invention, a forming bar (10) is adjustably mounted in the upper chamber (1). When the aforementioned forming bar (10) is adjusted to adopt a particular shape, the different flexible elements can deform at the forming bar and the membrane and the reinforcing elements are hot pressed with a portion corresponding to the forming bar having a three dimensional shape, thereby defining the form of the fabric produced.

31 Claims, 9 Drawing Sheets

(56) References Cited

U.S. PATENT DOCUMENTS

| | | |
|---|---|---|
| 3,956,447 A | 5/1976 | Denommee et al. |
| 3,974,791 A | 8/1976 | Haarstick et al. |
| 4,133,711 A | 1/1979 | August et al. |
| 4,444,822 A | 4/1984 | Doyle et al. |
| 4,499,842 A | 2/1985 | Mahr |
| 4,554,205 A | 11/1985 | Mahr |
| 4,590,121 A | 5/1986 | Mahr |
| 4,593,639 A | 6/1986 | Conrad |
| 4,604,319 A | 8/1986 | Evans et al. |
| 4,624,205 A | 11/1986 | Conrad |
| 4,676,853 A | 6/1987 | Lerma |
| 4,679,519 A | 7/1987 | Linville |
| 4,708,080 A | 11/1987 | Conrad |
| 4,731,144 A | 3/1988 | Kommineni et al. |
| 4,820,568 A * | 4/1989 | Harpell et al. ............ 428/113 |
| 4,831,953 A | 5/1989 | Conrad |
| 4,864,953 A | 9/1989 | Allsopp et al. |
| 4,892,780 A | 1/1990 | Cochran et al. |
| 4,943,472 A | 7/1990 | Dyksterhouse et al. |
| 4,945,848 A | 8/1990 | Linville |
| 5,001,003 A | 3/1991 | Mahr |
| 5,014,755 A | 5/1991 | Bompard et al. |
| 5,038,700 A | 8/1991 | Conrad |
| 5,079,055 A | 1/1992 | Doyle |
| 5,097,783 A | 3/1992 | Linville |
| 5,097,784 A | 3/1992 | Baudet |
| 5,161,479 A | 11/1992 | Mahr |
| 5,172,647 A | 12/1992 | Towne |
| 5,304,414 A | 4/1994 | Bainbridge et al. |
| 5,333,568 A | 8/1994 | Meldner et al. |
| 5,352,311 A | 10/1994 | Quigley |
| 5,355,820 A | 10/1994 | Conrad et al. |
| 5,394,563 A | 3/1995 | Doyle |
| 5,403,641 A | 4/1995 | Linville et al. |
| 5,470,632 A | 11/1995 | Meldner et al. |
| 5,589,254 A * | 12/1996 | Dischler ............ 428/221 |
| 5,643,522 A | 7/1997 | Park |
| 6,090,234 A | 7/2000 | Barone et al. |
| 6,106,649 A | 8/2000 | Slyne |
| 6,112,689 A | 9/2000 | Baudet |
| 6,257,160 B1 | 7/2001 | Keire |
| 6,265,047 B1 | 7/2001 | Chapuis et al. |
| 6,302,044 B1 | 10/2001 | Baudet |
| 6,332,420 B1 | 12/2001 | Rodgers |
| 6,624,098 B1 | 9/2003 | Mahr |
| 6,725,885 B2 | 4/2004 | Mahr |
| 6,761,795 B2 | 7/2004 | Chapuis et al. |
| 6,836,939 B2 | 1/2005 | Guirman et al. |
| 6,925,950 B2 | 8/2005 | Baudet |
| 7,051,666 B2 | 5/2006 | Baudet |
| 7,479,200 B2 | 1/2009 | Gautier et al. |
| 2002/0177377 A1 | 11/2002 | Mahr |
| 2006/0157189 A1 | 7/2006 | Gautier et al. |
| 2007/0218793 A1 | 9/2007 | Rossignol |
| 2009/0133818 A1 | 5/2009 | Gautier et al. |
| 2009/0140455 A1 | 6/2009 | Gautier et al. |
| 2009/0173266 A1 | 7/2009 | Gautier et al. |
| 2009/0173267 A1 | 7/2009 | Gautier et al. |
| 2009/0173432 A1 | 7/2009 | Gautier et al. |
| 2012/0102678 A1 | 5/2012 | Junker et al. |

FOREIGN PATENT DOCUMENTS

| | | |
|---|---|---|
| EP | 0 056 657 B1 | 7/1982 |
| EP | 0 224 729 A1 | 6/1987 |
| EP | 0 271 215 A1 | 6/1988 |
| EP | 0 281 322 A1 | 9/1988 |
| EP | 0475 083 B1 | 3/1992 |
| EP | 1 705 273 A2 | 9/2006 |
| EP | 1 744 877 | 1/2007 |
| EP | 2179917 A1 | 4/2010 |
| EP | 2189269 A1 | 5/2010 |
| EP | 2298535 B1 | 2/2012 |
| FR | 0 403 787 | 10/2005 |
| GB | 2 016 368 A | 9/1979 |
| GB | 2 280 516 A | 2/1995 |
| GB | 2 313 607 A | 12/1997 |
| JP | 2005290575 A | 10/2005 |
| WO | WO 87/07233 A1 | 12/1987 |
| WO | WO 94/11185 A1 | 5/1994 |
| WO | WO 94/17848 A1 | 5/1994 |
| WO | WO 96/07532 A1 | 3/1996 |
| WO | WO 01/11185 A | 3/2001 |
| WO | WO 01/17848 A1 | 3/2001 |
| WO | WO 2004/005009 A | 1/2004 |
| WO | WO 2005/102690 A1 | 3/2005 |

OTHER PUBLICATIONS

Communication regarding transmission of the European search report for European Application No. 09175448.1, European Search Report and European Search Opinion sent to foreign agent on Mar. 30, 2010, 5 pages.

Communication regarding transmission of the European search report for European Application No. 09176973.7, European Search Report and European Search Opinion sent to the foreign associate on Mar. 30, 2010, 4 pages.

Extended Search Report for EP10185558.3, mail date Feb. 14, 2011, 4 pages.

Office Action for U.S. Appl. No. 10/521,160, mail date Jun. 27, 2007, 5 pages.

Amendment and Reply for U.S. Appl. No. 10/521,160, mail date Dec. 21, 2007, 48 pages.

Office Action for U.S. Appl. No. 10/521,160, mail date May 29, 2008, 7 pages.

Notice of Allowance for U.S. Appl. No. 10/521,160, mail date Sep. 16, 2008, 4 pages.

Office Action for U.S. Appl. No. 12/274,163, mail date Dec. 21, 2010, 10 pages.

Amendment and Reply for U.S. Appl. No. 12/274,163, mail date Mar. 21, 2011, 16 pages.

Office Action for U.S. Appl. No. 12/326,683, mail date Dec. 21, 2010, 9 pages.

International Search Report for PCT/CH03/00415, issued Sep. 9, 2003.

International Search Report for PCT/US2009/065174, issued Mar. 28, 2011.

Final Office Action for U.S. Appl. No. 12/326,683, mail date Jun. 8, 2011, 12 pages.

Office Action for U.S. Appl. No. 12/326,683, mail date Oct. 11, 2011, 13 pages.

Office Action for U.S. Appl. No. 12/274,209 mail date May 18, 2011, 6 pages.

Office Action for U.S. Appl. No. 12/274,209 mail date Oct. 13, 2011, 6 pages.

Office Action for U.S. Appl. No. 12/274,214 mail date May 18, 2011, 7 pages.

Final Office Action for U.S. Appl. No. 12/274,214 mail date Oct. 12, 2011, 6 pages.

Interview Summary for U.S. Appl. No. 12/274,214 mail date Oct. 12, 2011, 2 pages.

Interview Summary for U.S. Appl. No. 12/274,214 mail date Nov. 30, 2011, 3 pages.

Office Action for U.S. Appl. No. 12/274,163, mail date Sep. 8, 2011, 11 pages.

Final Office Action for U.S. Appl. No. 12/274,163, mail date Jun. 8, 2011, 13 pages.

Interview Summary for U.S. Appl. No. 12/326,683, mail date Jul. 27, 2011, 3 pages.

Interview Summary for U.S. Appl. No. 12/326,683, mail date Dec. 1, 2011, 3 pages.

Interview Summary for U.S. Appl. No. 12/274,163, mail date Dec. 1, 2011, 3 pages.

Interview Summary for U.S. Appl. No. 12/274,209 mail date Mar. 26, 2012, 3 pages.

Office Action for U.S. Appl. No. 12/274,209 mail date Jan. 24, 2012, 10 pages.

(56) References Cited

OTHER PUBLICATIONS

Interview Summary for U.S. Appl. No. 12/274,209 mail date Nov. 30, 2011, 3 pages.
Interview Summary for U.S. Appl. No. 12/274,209 mail date Oct. 13, 2011, 8 pages.
Interview Summary for U.S. Appl. No. 12/274,209 mail date Aug. 3, 2011, 3 pages.
Issue Notification for U.S. Appl. No. 12/274,214 mail date May 2, 2012, 1 page.
Notice of Allowance for U.S. Appl. No. 12/274,214 mail date Jan. 24, 2012, 7 pages.
Interview Summary for U.S. Appl. No. 12/274,214 mail date Aug. 3, 2011, 3 pages.
Response to International Search Report for EP 09175448.01, dated Jun. 21, 2011, 10 pages.
Office Action for EP 09175448.1, dated Aug. 5, 2011, 5 pages.
Gustafsson, Peter, "North Sails 3Di English version", www.blur.se/2010/04/26/north-sails-3di-english-version/, Apr. 26, 2010, 12 pages.
Boyd, James, "The 3Di revolution (part 2)", The Daily Sail www.thedailysail.com/inshore/10/55878/3di-part-two, Jun. 29, 2010, 5 pages.
Green, Sharon, "3Di Unmasked", Seahorse, pp. 42-45. No Date Available.
Boyd, James, "North Sails 3Di (part one)", The Daily Sail, www.thedailysail.com/inshores/10/55848/north-sails-3di, Jun. 25, 2010, 6 pages.
Definition of sail. Merriam Webster Dictionary, Tenth Edition, 1988, 3 pages.
Office Action for U.S. Appl. No. 12/274,209, mail date May 25, 2012, 6 pages.
Office Action for U.S. Appl. No. 12/6\326,683, mail date Jul. 19, 2012, 6 pages.

\* cited by examiner

METHOD OF PRODUCING REINFORCED, FORMED FABRICS

CROSS-REFERENCE TO RELATED PATENT APPLICATIONS

This application is a division of U.S. application Ser. No. 10/521,160 now U.S. Pat. No. 7,479,200, which is the national stage of PCT/CH2003/000415, filed Jun. 25, 2003, which claims priority to CH 1150/02, filed on Jul. 2, 2002, all of which are herein incorporated by reference in their entirety.

BACKGROUND OF THE INVENTION

The present invention relates to a method of manufacturing shaped and reinforced fabrics, and more particularly to a method of manufacturing shaped and reinforced fabrics continuously in alternation, the fabric being constituted by composite elements which are constituted by a membrane, impervious for example, which encases reinforcing elements, threads for example, the elements constituting the fabric being capable of being shaped in three dimensions so that the fabric has a desired shape in three dimensions.

Reinforced and shaped fabrics are used in all cases where a fabric has to be reinforced generally and in particular when a fabric has to be reinforced in particular directions which are determined by the forces that act on the fabric. By way of example, when a fabric acted on greatly by forces comprises fixing eyelets at the location of its corners or elsewhere, reinforcements may be necessary to distribute the forces, maintain the shape and avoid tears. Moreover, if large forces act between one or other of the eyelets, reinforcements may be necessary in the direction of the forces.

In many cases, it is necessary for the fabric to have particular shapes in three dimensions whether for reasons of performance or for aesthetic reasons.

The manufacture of high-performance reinforced and shaped fabrics is subject to several parameters including of course commercial criteria which require that a fabric must be high-performance, as light as possible and of course with a price as low as possible.

Many embodiments of reinforced and shaped fabrics and of reinforced and shaped fabric manufacture are known but they all have many drawbacks.

A basic drawback of all the known high-performance reinforced and shaped fabrics is that the structure of the fabric is constituted by an assembly of elements of the sandwich type, that is to say the fabric consists of at least three components, these being the reinforcing elements which are assembled by bonding in a sandwich between two polymerised plastic sheets, for example. This type of fabric construction is expensive and has a fairly heavy weight. The polymerised plastic sheets are semi-rigid and may not allow local deformations. The overall shape of the fabric must allow a desired shape to be obtained over the whole dimension of the fabric which consequently requires moulds with the total size of the sail which are very expensive. These manufacturing methods with total-size moulds have several drawbacks, one of the greatest of which is the cost which is inevitably carried over to the end product. Another drawback is the space requirement of these moulds which require very large production premises. Moreover, the large cost of the tools implies a lack of flexibility when changes in shape are necessary which slows down the development phases and makes them very expensive. As the reinforcing threads are generally each placed in one piece with these embodiments, the positioning is very tricky.

Other known embodiments are implemented by assembling several fabric panels from different cuts, the panels being assembled together by sewing or bonding. The location of the sewing is fragile and requires reinforcing panels themselves added on by sewing. The forces to which the fabric is subjected are therefore dependent on the strength of the sewing at these locations which, as said, has the drawback of requiring reinforcing panels which contribute towards increasing the overall weight of the fabric. Moreover, at the locations of the sewing and the reinforcing panels, the fabric is less flexible than the other panels of the fabric, which causes many creases and fatigue of the materials when the fabric takes the desired shape, which is unsightly and can reduce the performance of the fabric for certain forms of use.

SUMMARY OF THE INVENTION

The aims of the present invention therefore consist of remedying the aforementioned drawbacks of the known embodiments.

The aims are achieved according to the principles of the invention as described in claim 1.

The method of manufacturing shaped and reinforced fabrics according to the principles of the invention consists of carrying out the manufacture of the fabric continuously. A press of small width compared with the length of the fabric successively presses the constituent elements of the fabric. Reinforcing elements, threads for example, are prepared on a belt which is disposed able to move on a preparation table and discontinuous reinforcing elements are disposed overlapping the waiting part of the fabric already pressed. The reinforcing elements can thus be disposed in all directions according to the direction and magnitude of the forces to which the fabric is subjected. The upper and lower chambers of the press comprise movable and adjustable devices which make it possible to obtain, during pressing, a desired shape in three dimensions at desired locations. By successive forward movements of the fabric and depending on the adjustments, the fabric can have flat portions or have portions in three dimensions, and the shape of the portions in three dimensions can be varied quickly according to the final shape provided for the fabric. The elements that constitute the fabric consist of threads which are encased by a membrane which is constituted by resin. Before pressing, these elements are in the form of strips which can be constituted by a prepreg of resin and threads, the preimpregnation having the advantage of holding the threads. Once pressed, the fabric is constituted by the membrane which is the resin which encases the threads or rather the filaments of the threads. In fact the threads are constituted by thousands of filaments which are distributed over the width of each strip. During preparation, part of each strip is placed on the juxtaposed strips and during pressing the filaments of the different strips intermix so as to constitute a homogeneous and impervious fabric for example.

The principles of the invention have many advantages. One of the major advantages is that the fabric once completed is constituted, in section, by two elements, these being the membrane and the reinforcing filaments, and consequently the manufacturing method allows the elements to be reduced in comparison with the known three-layer embodiments. This reduction in the number of elements makes it possible to obtain a reduction in the weight and cost.

The fact that the completed fabric is in the form of a membrane encasing thousands of intermixed filaments makes it possible to obtain a highly homogeneous sail, with no creases and with reinforcements which make it possible to withstand all the forces to which the fabric can be subjected.

The membrane and the filaments also have the advantage of being practically indeformable in the direction of the forces whilst being highly flexible during folding of the fabric for example.

The press has a very small space requirement compared with the dimensions of fabrics to be manufactured which makes it possible to install it in premises of small dimensions.

The shaping device integrated with the press which makes it possible to obtain portions of fabric in three dimensions, which makes it possible to obtain a finished fabric in three dimensions, has many advantages. One of these advantages is that the shaping device makes it possible to eliminate the expensive tools such as the three-dimensional moulds or tools. This is because the shaping device can allow a multitude of different shapes to be obtained by simple and very quick adjustments. This advantage is very important during manufacture but is also very important during the development of new fabrics having new shapes, the adjustment device making it possible to obtain a new shape very quickly by simple and quick adjustments.

The principles of the invention make it possible to considerably reduce the manufacturing costs whilst making it possible to obtain higher performance fabrics.

The accompanying figures illustrate schematically and by way of example the principles of the invention.

DETAILED DESCRIPTION OF THE PREFERRED EMBODIMENTS

Figure 1:
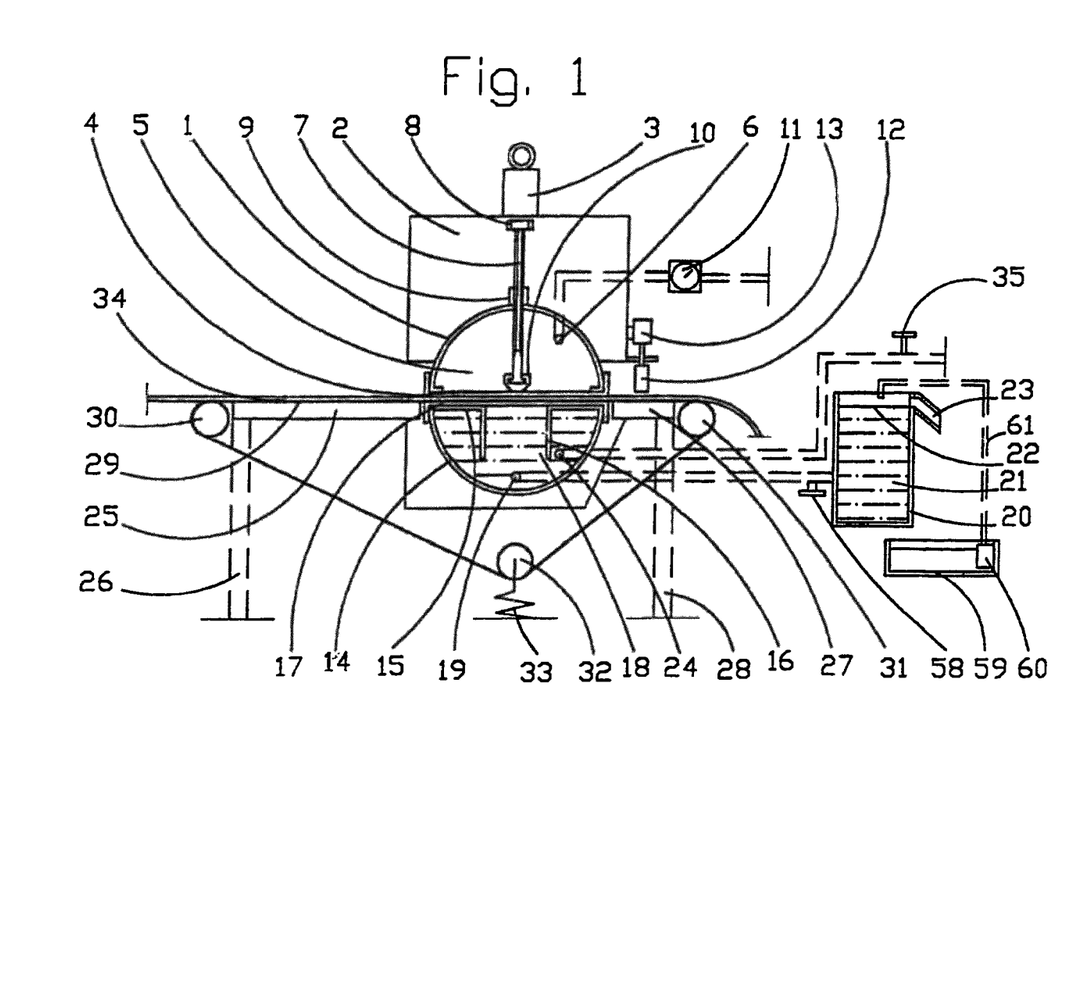
FIG. 1 is an overall side view of the press and the various elements attached to the press.

With reference first of all to FIG. 1, a press is constituted by an upper chamber 1 and a lower chamber 14. The lower chamber 14 comprises L-shaped angle irons 15 and 16. The upper part of the lower chamber 14 comprises a flexible element 17 (a silicone membrane for example) which is mounted hermetically on the lower chamber 14. The lower chamber 14 is filled with water 18 which is brought via a water inlet 24. The water inlet is controlled by a valve 35. The lower chamber comprises a water outlet 19 which is a balancing outlet. The water outlet 19 is connected by a duct to a tank 20 which contains water 21. The tank comprises a water overflow 23 which determines the height of the water level 22. The height of the water level 22 is provided to be at the level of the lower face of the flexible element 17. The water level in the lower chamber is thus controlled by the communicating vessels principle. A valve 58 is mounted between the water outlet 19 and the tank 20. Closing of the valve 58 makes it possible to block off the water circulation and annul the communicating vessels principle. A balancing tank 59 is placed under the overflow 23. When water overflows via the overflow 23 into the balancing tank 59, the surplus water in the balancing tank is constantly taken back into the tank 20 via a duct 61 which is connected to a pump 60. The upper chamber 1 is closed off in its lower part by a flexible element 4 which is mounted hermetically with the upper chamber. The upper chamber contains air 5 which is brought via an air inlet 6. The pressure of the air is controlled by a manometer 11. The upper chamber 1 comprises reinforcing elements 2. A metal girder 3 is mounted on the reinforcing elements, the whole being assembled by welding for example. The metal girder 3 is connected to an actuator or to any mechanical device whatsoever making it possible on the one hand to lift up the chamber during the preparation operations or to apply a pressure downwards during the pressing operation. A threaded rod 7 which comprises an activation nut 8 cooperates with a tapped element 9 which is mounted on the upper chamber. The lower end of the rod is connected with play to a shaping bar 10. A preparation table 25 is mounted on feet 26 and a receiving table 27 is mounted on feet 28. A conveyor belt 29 is mounted able to move on the tables and on the flexible element 17 of the lower chamber 14. The conveyor belt is supported by two fixed rollers 30 and 31 and by a movable roller 32 which is subject to the action of a draw spring 33 which adjusts the tension of the conveyor belt 29 according to the deformations thereof. The reinforced strips 34 which constitute the fabric once the pressings have been performed are prepared on the conveyor belt, and then pass under the press and come out in the form of a fabric constituted by a membrane which encases filaments.

Figure 2:
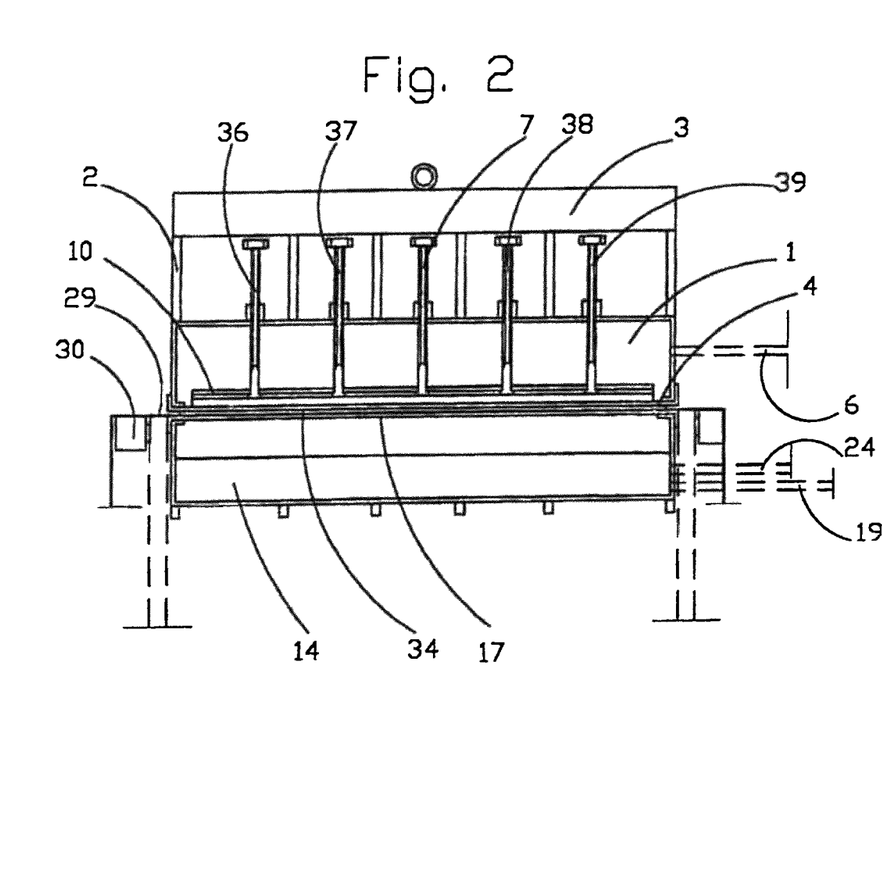
FIG. 2 is a front view of the press with the shaping device.

FIG. 2 shows in a front view the threaded rods 36, 37, 7, 38, 39, which are connected in their lower part to the shaping bar 10. The shaping bar is not fixed to the rods in its longitudinal direction, but is mounted able to move so that when the shaping bar is deformed the tensions on it can be absorbed. FIG. 2 shows the metal girder 3, the upper chamber 1 in which the shaping bar is installed and the reinforcing elements 2 of the upper chamber, the flexible elements 4 and 17, the water inlet 24, the balancing water outlet 19, the air inlet 6, the lower chamber 14, the conveyor belt 29 and the roller 30 and the reinforced strips 34.

The position shown in FIGS. 1 and 2 is the flat pressing position in which the shaping bar is in the inactive position. In this position, the water in the lower chamber is kept at its level by the communicating vessels principle and then the valve 58 is closed, and the air contained in the upper chamber is put under pressure, at a pressure value which is determined by the kind of resin of the reinforced strips.

During the pressing, the resin must be heated to or activated at a temperature determined by the kind of resin. Several heating possibilities can be provided according to FIG. 1. One possibility is heating of the air contained in the upper chamber. One possibility is heating of the water contained in the lower chamber. One possibility is heating of the preparation table just before the reinforced strips are moved under the press.

For the case where the heating is not obtained by the preparation table, this table is in any case heated to a certain temperature necessary for a slight adhesion of the reinforced strips in order to facilitate the putting down of these strips.

FIG. 1 shows an immobilising element 12 which is activated by an immobilising actuator 13. In the position of movement of the conveyor belt, the immobilising element is inactive.

In practice, the first reinforced strips are disposed on the preparation table. Once the reinforced strips have been put down, the conveyor belt places these first reinforced strips under the press, the upper chamber is moved towards the base until contact with pressure is made on the lower chamber, by heating and the air pressure in the upper chamber the reinforced strips are converted into a membrane encasing filaments, the whole constituting an impervious or pervious fabric. One or both chambers are cooled, thus cooling the membrane. Movement of the reinforced strips by the conveyor belt leaves a portion of the strips on the preparation table for connection with the second series of reinforced strips. During the time of pressing the first reinforced strips, the second strips are disposed on the preparation table and when the operation of pressing the first reinforced strips is accomplished, the air pressure is reset to ambient pressure, the upper chamber is lifted up and the second reinforced strips are placed under the press. The manufacturing time for a fabric is determined by the time necessary for heating of the reinforced strips and cooling. By way of example, according to the resins used, the pressing time can be limited to a few minutes which are necessary in any case for disposition of the next reinforcing strips.

Figure 3:
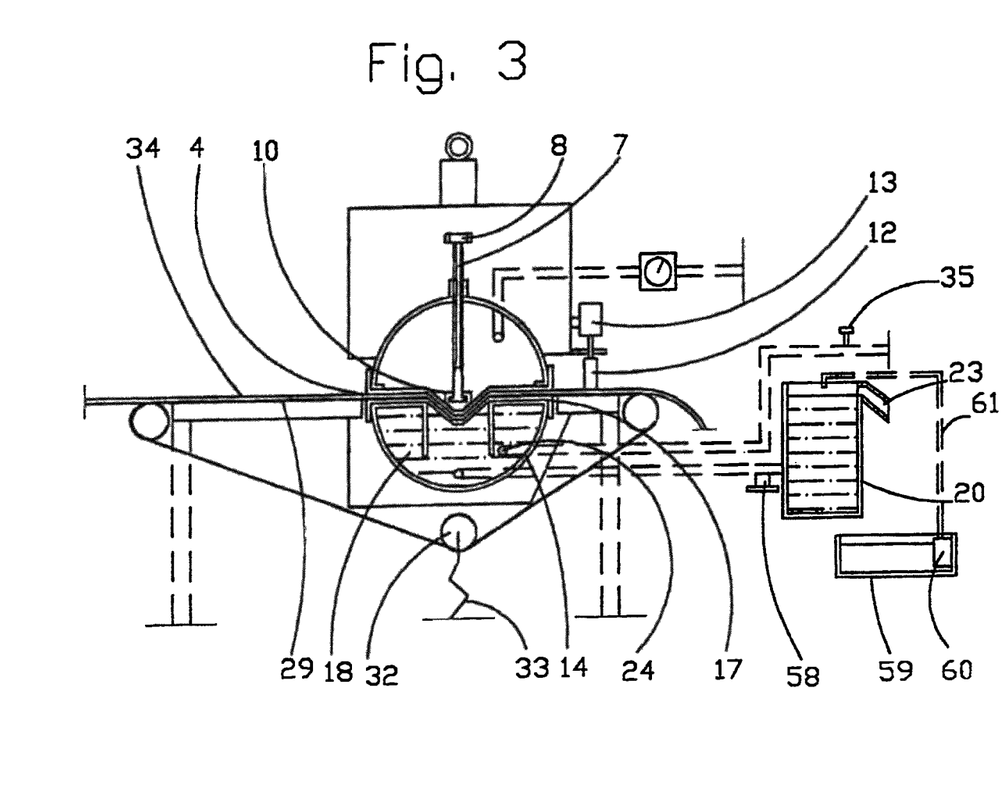
FIG. 3 is an overall side view of the press with the shaping device in the shaping position.
Figure 4:
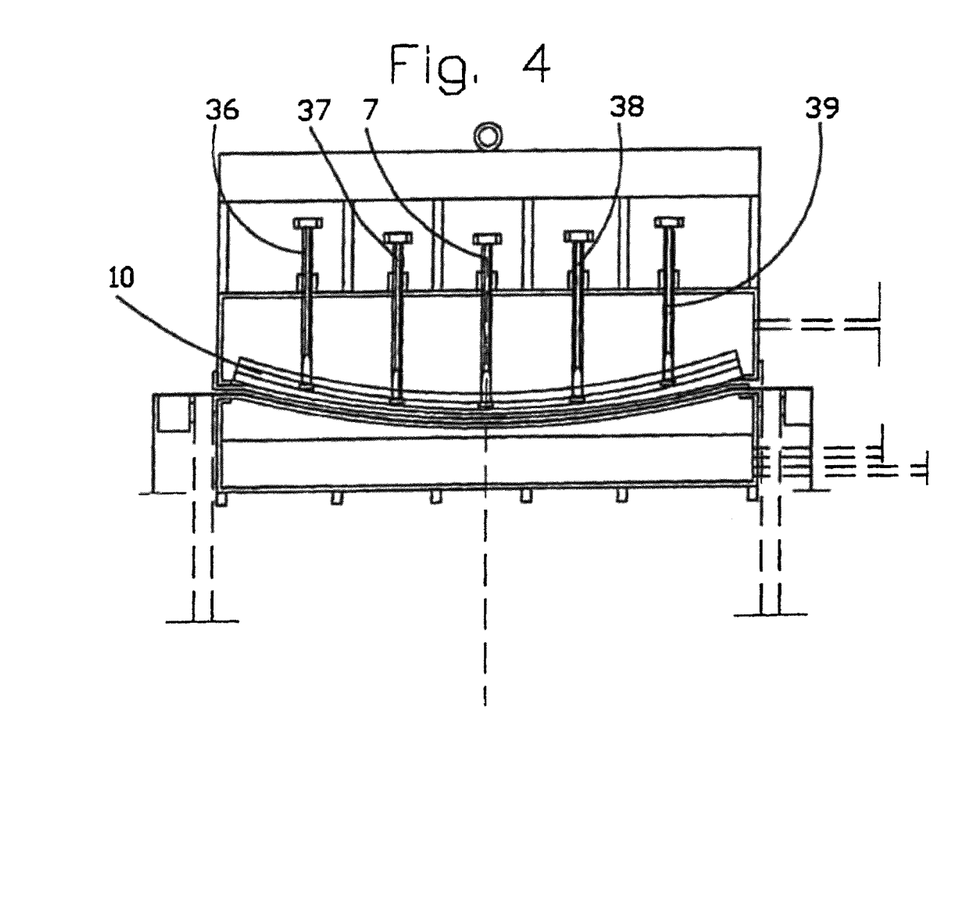
FIG. 4 is a front view of the press with the shaping device in the shaping position.

FIGS. 3 and 4 show the pressing of a portion of reinforced strips with shaping in three dimensions. In this case, when the reinforced strips 34 are installed under the press, the rods 36, 37, 7, 38, 39, are activated, for example by means of nuts such as the nut 8 so as to give an arc shape to the bar 10. The immobilising element 12 is activated by the immobilising actuator 13 and immobilises the portion of fabric already completed. In this way, the threads of the reinforced strips can take the shape provided for, and therefore the resulting difference in length of the third dimension. During the pressing with shaping, the flexible elements 4 and 17 and the conveyor belt 29 also take the chosen shape. The movable roller 32 moves upwards while maintaining the tension in the conveyor belt by the spring 33. The shaping position, and therefore the movement of the shaping bar 10 downwards, reduces the volume of the lower chamber 14 and the excess water 18 can leave via the water outlet which goes into the tank 20 and overflows via the overflow 23. The valve 58 is closed immobilising the quantity of water in the chamber 14, and the air 5 is put under pressure.

When the pressing is complete, the shaping bar is replaced into the inactive position, the valve 58 is opened, the water is put back to its level by the pump 60 which takes the excess water contained in the balancing tank 59 back into the tank 20 via the duct 61. The other pressing operations are identical to the flat pressing operations.

In practice and with the aim of obtaining the desired finished fabric shape in three dimensions, some portions of the fabric are pressed flat, and others with various shapes of the shaping bar.

Figure 5:
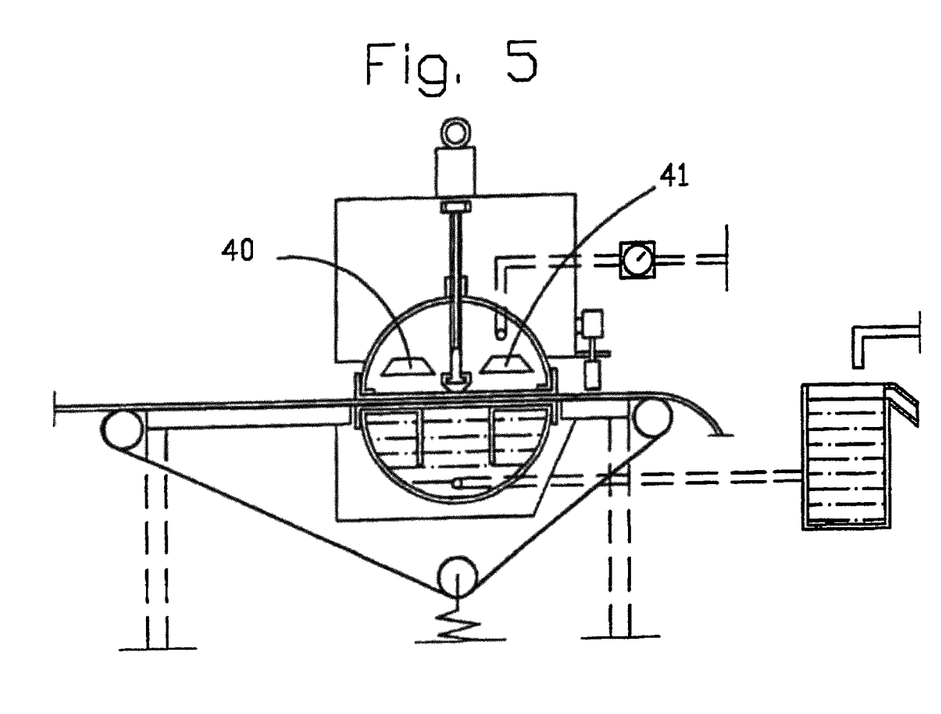
FIG. 5 is a view of the press with an infrared heating device.

FIG. 5 shows another heating possibility with infrared heating elements 40 and 41 which are disposed in the upper chamber.

Figure 6:
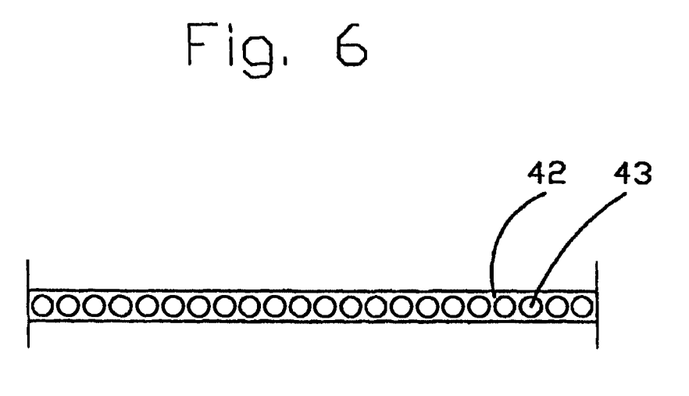
FIG. 6 is a sectional view of a membrane encasing threads disposed unidirectionally.

FIG. 6 shows a portion of fabric with the membrane 42 which encases the threads 43 disposed unidirectionally. In practice and after pressing, the threads are in fact constituted by thousands of filaments.

Figure 7:
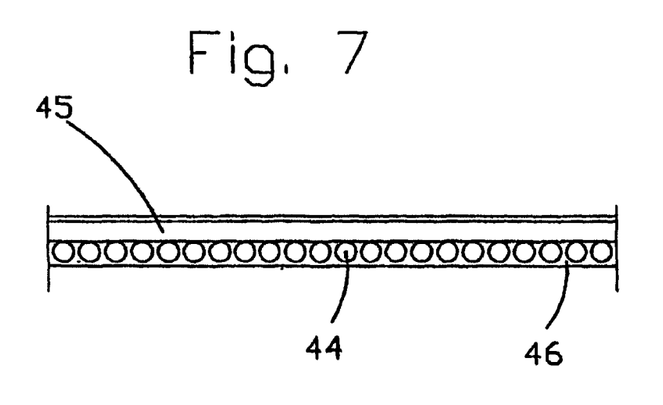
FIG. 7 is a sectional view of a membrane encasing threads disposed multidirectionally.

FIG. 7 shows a portion of fabric with the membrane 46 encasing warp threads 44 and weft threads 45 multidirectionally.

Figure 8:
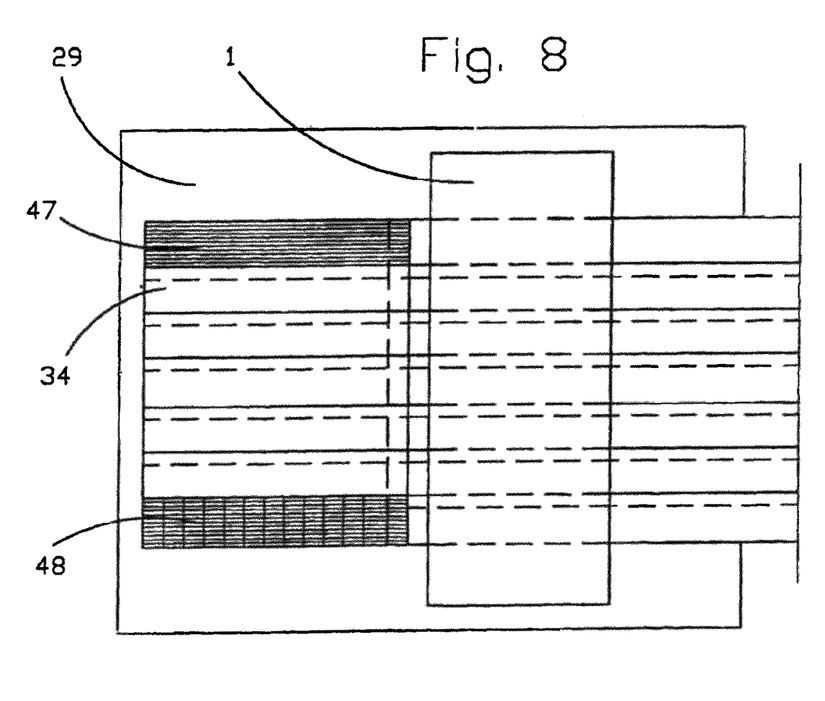
FIG. 8 is a plan view of strips before pressing.

FIG. 8 shows in plan view the reinforced strips 34 which are disposed on the conveyor belt 29 which is placed on the preparation table with passage under the press depicted in this figure by the upper chamber 1. FIG. 8 shows different sorts of unidirectional 47 or bidirectional 48 reinforced strips which can be used by way of example.

Figure 9:
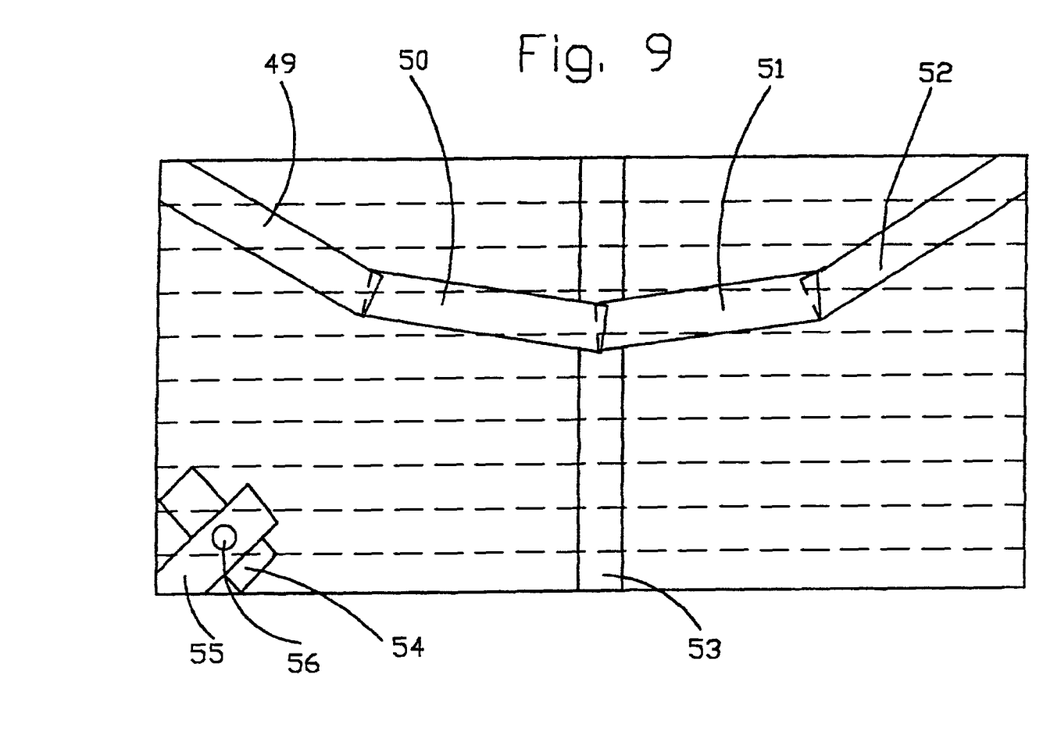
FIG. 9 is a plan view of a fabric with strips disposed in different directions.

FIG. 9 is a plan view of a fabric which shows a few example possibilities of disposition of reinforced strips, that is the reinforced strips 49, 50, 51, 52, which make it possible to obtain strength in an arc, the strip 53 which has a reinforcement at 90°, or strips 55 and 54 which can be disposed at the location of an eyelet 56 for example.

Figure 10:
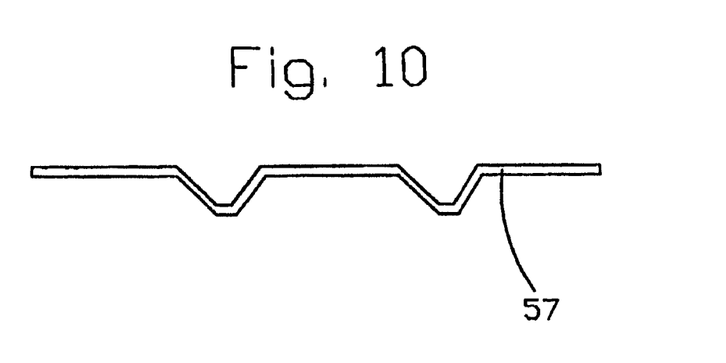
FIG. 10 is a sectional view of portions of fabric shaped in three dimensions.

FIG. 10 shows a sectional view of a fabric with portions deformed in three dimensions according to FIG. 4 in the non-taut position.

Figure 11:
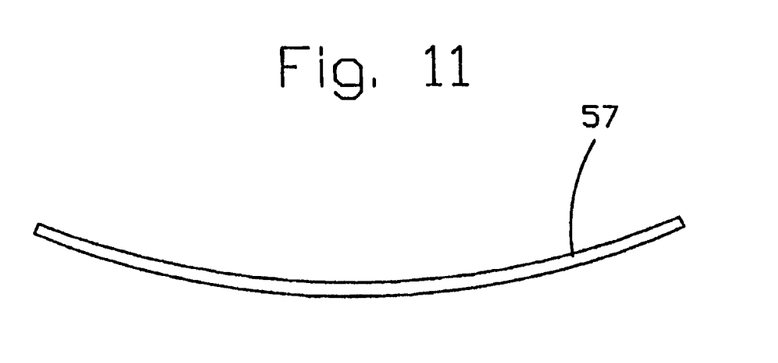
FIG. 11 is a sectional side view of a spread-out fabric.

FIG. 11 shows the three-dimensional shape taken by the fabric when it is taut.

The various activation elements, the threaded rods, the movements of the upper chamber, the forward movement of the conveyor belt, the immobilising element, opening and closing of the water supplies and outlets, switching on and off of the heating, and the air pressure, can be obtained by electric motors, step-by-step motors for example, actuators, valves or electrical controls. Each of these elements can be connected to a computer whose program manages the activation. It is also possible to dispose the reinforced strips by a transport and placing device which can also be managed by the computer program.

In this way, the manufacture of the fabric can be fully automatic.

There are numerous uses for fabrics in three dimensions, and these fabrics can be used in all cases requiring light, very strong and three-dimensional fabrics.

What is claimed is:

1. A method of manufacturing a sail, comprising:
   providing reinforcement elements comprising filaments;
   providing a resin in contact with the reinforcing elements;
   arranging the reinforcement elements and the resin into a plurality of first strips and into a plurality of second strips;
   positioning the plurality of first strips to partially overlap adjacent first strips to form a sheet;
   positioning the plurality of second strips on the first strips only along a predicted line of force to which the sail will be subjected, wherein the second strips do not extend to or beyond the outer dimension of the sheet; and
   forming a fabric of the sail by curing the resin of the first and second strips such that the cured resin encases the reinforcing elements, wherein the fabric is without exterior layers of polymerized plastic sheets,
   wherein the sail includes at least a leech and a foot.

2. The method of claim 1, wherein at least one additional second strip is positioned substantially parallel to the predicted line of force.

3. The method of claim 1, wherein at least one additional second strip is positioned substantially perpendicular to the predicted line of force.

4. The method of claim 1, wherein at least one additional second strip is positioned substantially parallel and at least another additional second strip is positioned substantially perpendicular to the predicted line of force.

5. The method of claim 1, wherein positioning comprises:
   positioning at least one additional second strip in a location where the fabric will require reinforcement.

6. The method of claim 1, wherein the first and second strips comprise reinforcing elements pre-impregnated with the resin.

7. The method of claim 1, wherein positioning the first strips comprises:
   positioning at least some of the first strips to overlap substantially along a length of each first strip.

8. The method of claim 1, wherein positioning the first strips comprises:
positioning at least some of the first strips in parallel, such that a first end of one first strip substantially overlaps a first end of a second first strip.

9. The method of claim 1, wherein, during the curing step, the filaments of partially overlapping first and second strips intermix with one another.

10. The method of claim 1, wherein the reinforcing elements comprise thousands of filaments that are distributed over the width of each first and second strip.

11. The method of claim 10, wherein the first strips are positioned such that the fabric comprises the thousands of filaments disposed unidirectionally in the sheet.

12. The method of claim 11, wherein the second strips are positioned such that the thousands of filaments in the second strips are disposed in a different direction relative to the filaments of the first strips.

13. The method of claim 1, wherein the sail further comprises at least one eyelet configured to operatively connect the sail to a wind-powered sailing vessel.

14. A method of manufacturing a sail, comprising:
providing a plurality of reinforcing elements, wherein the reinforcing elements are formed from filaments which are aligned;
providing a resin in contact with the reinforcing elements;
arranging the reinforcing elements and the resin to form a plurality of first strips and to form a plurality of second strips;
arranging the plurality of first strips to partially overlap adjacent first strips, the plurality of first strips defining a sheet with an outer dimension;
positioning the plurality of second strips on the sheet of first strips along a predicted line of force to which the sail will be subjected, wherein the second strips do not extend to or beyond the outer dimension of the sheet of first strips;
placing the arranged strips on a surface; and
forming a fabric of the sail by curing the resin of the strips such that the cured resin encases the reinforcing elements, wherein the fabric is without exterior layers of polymerized plastic sheets,
wherein the sail includes at least a leech and a foot.

15. The method of claim 14, wherein at least one additional second strip is positioned substantially parallel to the predicted line of force.

16. The method of claim 14, wherein at least one additional second strip is positioned substantially perpendicular to the predicted line of force.

17. The method of claim 14, wherein at least one additional second strip is positioned substantially parallel and at least another additional second strip is positioned substantially perpendicular to the predicted line of force.

18. The method of claim 14, wherein positioning the plurality of second strips comprises:
positioning at least one additional second strip in a location where the fabric will require reinforcement.

19. The method of claim 14, wherein the first and second strips comprise reinforcing elements pre-impregnated with the resin.

20. The method of claim 14, wherein arranging the first strips comprises:
positioning at least some of the first strips to overlap substantially along a length of each first strip.

21. The method of claim 14, wherein arranging the first strips comprises:
positioning at least some of the first strips in parallel, such that a first end of one first strip substantially overlaps a first end of a second first strip.

22. The method of claim 14, wherein the sail further comprises at least one eyelet configured to operatively connect the sail to a wind-powered sailing vessel.

23. A method of manufacturing a sail, comprising:
providing reinforcement elements comprising filaments;
providing a resin in contact with the reinforcing elements;
arranging the reinforcement elements and the resin into a plurality of first strips, a second strip, and a third strip;
arranging the plurality of first strips on a surface so that at least some of the first strips partially overlap adjacent first strips, the plurality of first strips defining an outer dimension;
positioning the second strip and the third strip along only a predicted line of force to which the sail will be subjected, and such that the second strip and the third strip do not extend to or beyond the outer dimension; and
forming a fabric of the sail by curing the resin of the strips such that the cured resin encases the reinforcing elements,
wherein the fabric of the sail consists essentially of the cured resin and the reinforcing elements, and wherein the sail includes at least a leech and a foot.

24. The method of claim 23, further comprising arranging the reinforcement elements and the resin into a fourth strip, wherein the fourth strip is positioned substantially parallel to the predicted line of force.

25. The method of claim 23, further comprising arranging the reinforcement elements and the resin into a fourth strip, wherein the fourth strip is positioned substantially perpendicular to the predicted line of force.

26. The method of claim 23, further comprising arranging the reinforcement elements and the resin into a fourth strip and a fifth strip, wherein the fourth strip is positioned substantially parallel and the fifth strip is positioned substantially perpendicular to the predicted line of force.

27. The method of claim 23, further comprising arranging the reinforcement elements and the resin into a fourth strip, and positioning the fourth strip in a location where the fabric will require reinforcement.

28. The method of claim 23, wherein the first, second, and third strips comprise reinforcing elements pre-impregnated with the resin.

29. The method of claim 23, wherein arranging the first strips comprises:
positioning at least some of the first strips to overlap substantially along a length of each first strip.

30. The method of claim 23, wherein arranging the first strips comprises:
positioning at least some of the first strips in parallel, such that a first end of one first strip substantially overlaps a first end of a second first strip.

31. The method of claim 23, wherein the sail further comprises at least one eyelet configured to operatively connect the sail to a wind-powered sailing vessel.

* * * * *